(12) United States Patent
Sugita et al.

(10) Patent No.: US 8,928,313 B2
(45) Date of Patent: Jan. 6, 2015

(54) MAGNETIC ENCODER WITH IMPROVED RESOLUTION

(71) Applicant: Sanyo Denki Co., Ltd., Tokyo (JP)

(72) Inventors: Satoshi Sugita, Nagano (JP); Yuqi Tang, Nagano (JP); Yasushi Misawa, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 231 days.

(21) Appl. No.: 13/661,247

(22) Filed: Oct. 26, 2012

(65) Prior Publication Data

US 2013/0106406 A1  May 2, 2013

(30) Foreign Application Priority Data

Oct. 28, 2011  (JP) ................. 2011-237779

(51) Int. Cl.
  *G01B 7/30* (2006.01)
  *G01D 5/245* (2006.01)
(52) U.S. Cl.
  CPC ................ *G01B 7/30* (2013.01); *G01D 5/2451* (2013.01)
  USPC ..................................... 324/207.25
(58) Field of Classification Search
  USPC .................................... 324/207.25
  See application file for complete search history.

(56) References Cited

U.S. PATENT DOCUMENTS

| 2004/0246148 A1 | 12/2004 | Kabashima et al. |
| 2008/0066548 A1 | 3/2008 | Jajtic et al. |
| 2008/0265826 A1 | 10/2008 | Sasaki et al. |

FOREIGN PATENT DOCUMENTS

| JP | 2002-062162 | 2/2002 |
| JP | 2006-058256 | 3/2006 |
| JP | 2006-105757 | 4/2006 |
| JP | 2008-064537 | 3/2008 |
| JP | 2008-514906 | 5/2008 |
| JP | 2008-151774 | 7/2008 |
| JP | 2008-289345 | 11/2008 |
| JP | 4258376 | 4/2009 |
| JP | 2009-247105 | 10/2009 |
| JP | 2010-071901 | 4/2010 |
| WO | 03/036237 | 5/2003 |

*Primary Examiner* — Reena Aurora
(74) *Attorney, Agent, or Firm* — Rankin, Hill & Clark LLP

(57) ABSTRACT

A low-cost magnetic encoder that facilitates generating sinusoidal magnetic flux is provided. First and second permanent magnet arrays each include a plurality of permanent magnets arranged such that magnetic poles having the same polarity face each other, and magnetic yokes disposed on side surfaces of the plurality of permanent magnets. The permanent magnets and the magnetic yokes are arranged side by side at a predetermined pitch in the moving direction of a magnetic piece array. First and second magnetic detectors corresponding to the first and second permanent magnet arrays are disposed in a positional relationship allowing detection of leakage magnetic flux generated when the permanent magnet arrays and the magnetic piece array are displaced with respect to each other.

22 Claims, 25 Drawing Sheets

$P/2 < \tau_p < P$ $P/4 < \tau_p < P/2$

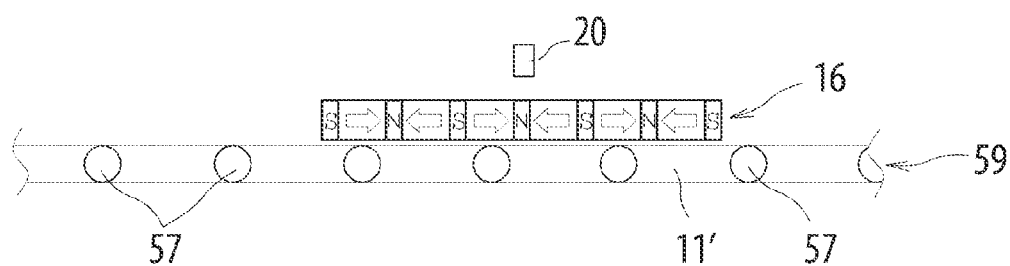
Fig. 9E
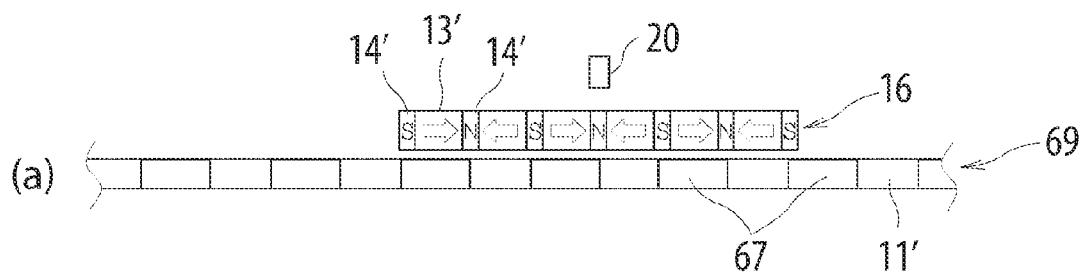
Fig. 9F
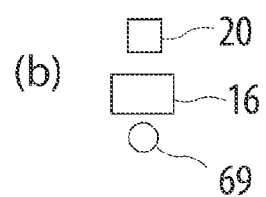

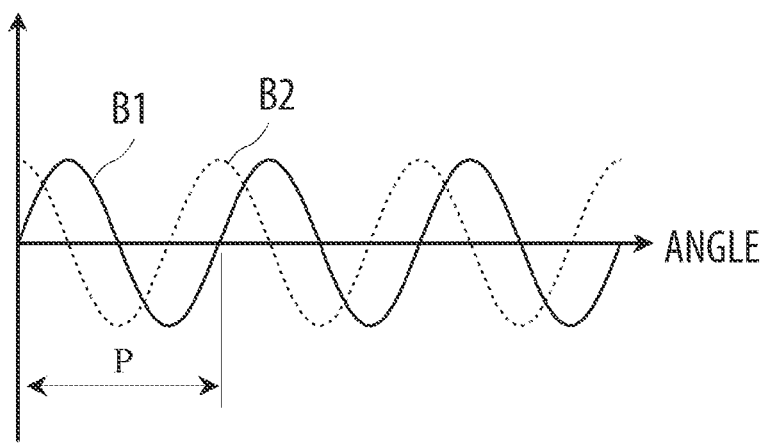
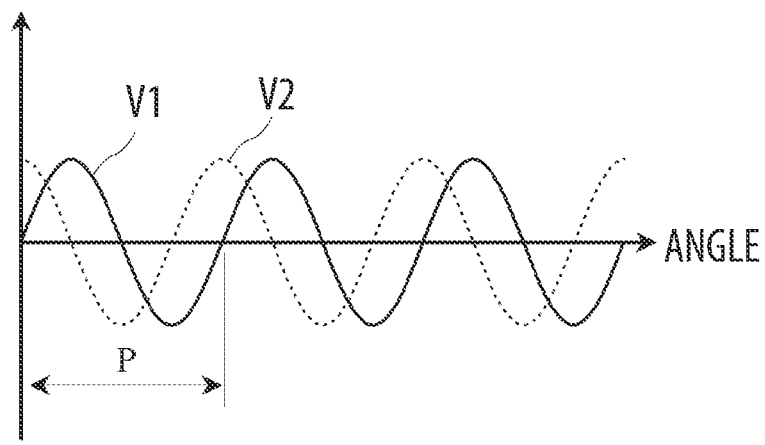

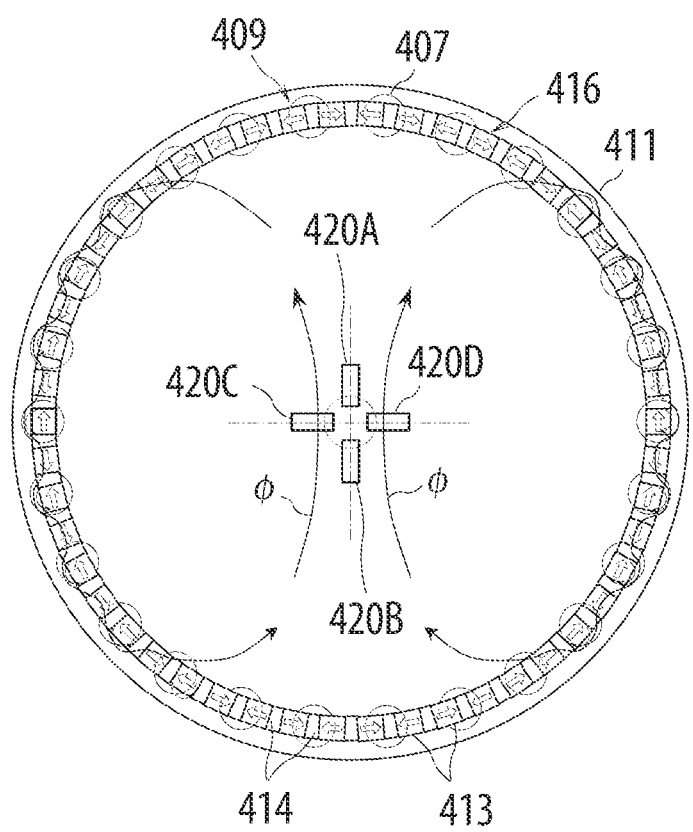

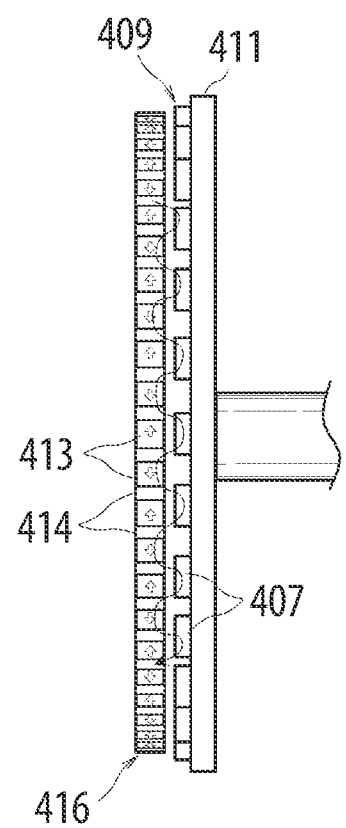

MAGNETIC ENCODER WITH IMPROVED RESOLUTION

TECHNICAL FIELD

The present invention relates to a magnetic encoder.

BACKGROUND ART

Magnetic encoders including magnets and magnetic detecting elements are used. In the magnetic encoders which use only magnets, however, an error due to the magnets is detected as it is, which may result in a large error. In order to reduce such an error, magnetic encoders provided with a correcting mechanism are also proposed. However, the correcting mechanism or circuit may be complicated. For example, in a multi-rotation encoder disclosed in Japanese Patent No. 4258376, which utilizes magnetic coupling, the proportion of a magnetically coupled area is small, and the allowable transfer torque is low. Therefore, synchronization may be lost upon abrupt rotation. In addition, an error due to one magnet is detected as it is, which may result in a large error.

In an encoder used for speed measurement in a permanent-excitation electric synchronous machine disclosed in Japanese Patent Application Publication No. 2008-514906, a regular sinusoidal wave may not be obtained, and the accuracy may not be increased. In addition, a large amount of magnetic flux leaks, and only a small amount of magnetic flux reaches a magnetic sensor portion. Therefore, the S/N ratio may not be increased, which may result in a low accuracy.

Also in the structure of a magnetic pole position detector disclosed in Japanese Patent Application Publication No. 2002-62162, a large amount of magnetic flux leaks, and only a small amount of magnetic flux reaches a magnetic sensor portion. Therefore, the S/N ratio may not be increased, which may result in a low accuracy.

In a rotational angle detecting device disclosed in Japanese Patent Application Publication No. 2008-151774, a plurality of Hall sensors are used in an attempt to increase accuracy. However, distortion may still remain, and an accurate sinusoidal wave may not be obtained.

In a linear resolver disclosed in Japanese Patent Application Publication No. 2008-64537, it is difficult to make a calibration in case of a long stroke, and a small pitch may not be used. Therefore, the accuracy may not be increased.

In a method of setting an origin of a linear motor disclosed in Japanese Patent Application Publication No. 2008-289345, a small pitch may not be used, and it is difficult to obtain sinusoidal magnetic flux. Therefore, the accuracy may not be increased.

In a technology for detecting the position of a shaft motor disclosed in Japanese Patent Application Publication No. 2009-247105, a small pitch may not be used, and it is difficult to obtain sinusoidal magnetic flux. Therefore, the accuracy may not be increased.

Also in a magnetic detecting device disclosed in Japanese Patent Application Publication No. 2006-105757 and a rotation detecting device disclosed in Japanese Patent Application Publication No. 2006-58256, it is difficult to obtain sinusoidal magnetic flux. Therefore, the accuracy may not be increased.

In a position detecting device disclosed in Japanese Patent Application Publication No. 2010-71901, the position detecting accuracy depends on the accuracy of positioning magnets, which may result in a low mass productivity in consideration of variations in characteristics of the magnets.

Sinusoidal signals output from the conventional magnetic encoders are not perfectly sinusoidal, but are distorted with distortion components such as high-order harmonic components superimposed thereon. Such distortion in waveform may reduce accuracy. In order to avoid a reduction in accuracy due to waveform distortion, manufacturers have contrived to use a plurality of magnetic sensors, or to construct a system that makes a calibration using a ROM table or the like. However, such solutions are not satisfactory in terms of cost and response.

SUMMARY OF THE INVENTION

An object of the present invention is to provide a low-cost magnetic encoder that facilitates generating sinusoidal magnetic flux and that improves resolution and interpolation accuracy.

Another object of the present invention is to provide a magnetic encoder capable of generating sinusoidal magnetic flux with little waveform distortion.

The present invention provides a magnetic encoder including: a permanent magnet array including a plurality of permanent magnets arranged such that magnetic poles having the same polarity face each other, or arranged such that the magnetic poles having different polarities face each other through a non-magnetic member interposed therebetween; a magnetic piece array including a plurality of magnetic pieces spaced from each other along the permanent magnet array; and a magnetic detector configured to detect leakage magnetic flux generated when the permanent magnet array and the magnetic piece array are displaced with respect to each other. A pitch of the plurality of permanent magnets and a pitch of the plurality of magnetic pieces are determined to form a magnetic path in which magnetic flux emitted from one of the permanent magnets in the permanent magnet array passes through one of the magnetic pieces that faces the permanent magnet or the non-magnetic member adjacent to the one permanent magnet when the permanent magnet array and the magnetic piece array are continuously displaced with respect to each other.

According to the present invention, synthesized magnetic flux synthesized from magnetic fluxes emitted from the permanent magnets included in the magnetic path is obtained when the permanent magnet array and the magnetic piece array are displaced with respect to each other. As a result, the effect of one permanent magnet can be reduced by increasing the number of the permanent magnets, allowing generation of sinusoidal magnetic flux with little distortion. By detecting leakage magnetic flux due to the generated magnetic flux using the magnetic detector, a sinusoidal signal can be obtained without requiring a special correcting circuit. As a result, it is possible to improve resolution and interpolation accuracy. The permanent magnet array is formed to include two or more permanent magnets (that may be physically separated from or integrated with each other) to provide at least two or more magnetic poles. As the number of poles for the permanent magnets in the permanent magnet array facing the magnetic piece array is increased, the detected magnetic flux approaches an accurate sinusoidal wave, thereby increasing accuracy. If the permanent magnets provide a small number (such as two) of poles, a low-cost magnetic sensor can be provided.

When the pitch P of the magnetic pieces is defined as $P=360°$ in terms of electrical angle, the pitch $\tau p$ of the permanent magnets preferably satisfies $P/4 < \tau p < P$ in terms of electrical angle. With this configuration, more accurate sinusoidal output can be obtained, providing a high-accuracy and high-resolution magnetic encoder.

The magnetic encoder may further include magnetic yokes disposed on both sides of each of the plurality of permanent magnets. This makes it possible to efficiently enhance flow of magnetic flux, and to reduce a repulsive force generated when the permanent magnets of the same polarity are caused to face each other, thereby facilitating manufacturing the permanent magnet array. As a matter of course, the plurality of permanent magnets in the permanent magnet array may be directly joined to each other. With this configuration, the amount of the permanent magnets can be increased.

The magnetic encoder may further include coupling yokes configured to magnetically couple the magnetic yokes located on both ends of the permanent magnet array to collect leakage magnetic flux from the permanent magnet array. In this case, the magnetic detector may be disposed to detect the leakage magnetic flux passing through the coupling yokes. Use of the coupling yokes enhances the intensity of magnetic flux detected by the magnetic detector, thereby providing higher sensitivity and improving accuracy and resolution.

The magnetic detector may be disposed at any position as long as leakage magnetic flux can be detected. For example, the magnetic detector may be disposed to face the permanent magnet array with the magnetic piece array interposed therebetween. Alternatively, the magnetic detector may be disposed to face both the magnetic piece array and the permanent magnet array. Further, the magnetic detector may be disposed adjacent to the magnetic yoke on an extension line of the permanent magnet array. Magnetic flux can be reliably detected at such positions.

One of the permanent magnet array and the magnetic piece array may be longer than the other. The plurality of magnetic pieces forming the magnetic piece array may have an integral structure in which the magnetic pieces are coupled to each other by a coupling member having a magnetic resistance higher than that of the magnetic pieces. Such an integral structure facilitates manufacture and attachment of the magnetic piece array.

The plurality of magnetic pieces forming the magnetic piece array is not limited in any way as long as sinusoidal magnetic flux is obtained, and may have a rectangular or circular profile as seen from the permanent magnet side, for example. Alternatively, the plurality of magnetic pieces forming the magnetic piece array may have a columnar shape with a circular profile as seen in a direction orthogonal to an extending direction of the magnetic piece array and to a direction toward the permanent magnet array. Further, the plurality of magnetic pieces forming the magnetic piece array may have a columnar shape with a circular profile as seen in an extending direction of the magnetic piece array. Furthermore, the permanent magnets and the magnetic yokes may be formed to have an annular shape to surround the magnetic piece array. In this case, the magnetic piece array may have an annular columnar shape with a circular profile as seen in an extending direction of the permanent magnet array. If the permanent magnets and the magnetic yokes are formed to have an annular shape, the gap between the permanent magnet array and the magnetic piece array is constant, reducing distortion caused in the sinusoidal magnetic flux.

More specifically, the magnetic piece array may be fixed to a circular plate to form an annular array along an outer peripheral surface of the circular plate. The circular plate is configured to be directly or indirectly rotated by rotation of a rotary shaft. In this case, two or more permanent magnet arrays may be disposed to arcuately extend to face the magnetic piece array. If the magnetic encoder is configured in this way, at least two sinusoidal signals at different phases can be obtained, thereby facilitating detection of the rotational position of the rotary shaft. Also in this case, when the pitch P of the magnetic pieces is defined as P=360° in terms of electrical angle, the pitch τp of the permanent magnets preferably satisfies $P/4 < \tau p \leq P/2$. In addition, magnetic yokes are preferably disposed on both sides of each of the plurality of permanent magnets. Further, preferably, the magnetic encoder further includes coupling yokes configured to magnetically couple the magnetic yokes located at both ends of the permanent magnet array to collect leakage magnetic flux from the permanent magnet array, and the magnetic detector is disposed to detect the leakage magnetic flux passing through the coupling yokes. With this configuration, two or more sinusoidal magnetic fluxes at different phases can be generated, providing a high-accuracy magnetic encoder. When the pitch P of the magnetic pieces is defined as P=360° in terms of electrical angle, the pitch τp of the permanent magnets may satisfy $P/4 < \tau p < P$, and two magnetic piece arrays may be disposed at positions 180° away from each other in terms of mechanical angle. In addition, two magnetic detectors may be provided in correspondence with the two magnetic piece arrays, one of the two magnetic detectors being located P/4 away from an imaginary line connecting between the two magnetic piece arrays in a rotational direction of the rotary shaft, and the other of the two magnetic detectors being located P/4 away from the imaginary line in a direction opposite to the rotational direction of the rotary shaft. By adopting such an arrangement, the direction of magnetic flux that interlinks with each magnetic detector is reversed. As a result, a high S/N ratio can be obtained by connecting outputs of the two magnetic detectors to obtain a difference therebetween. In addition, it is possible to provide a more accurate magnetic encoder that can cancel the effect of an external magnetic field and that is resistant to disturbance due to an external magnetic field.

The permanent magnet array may be configured as an annular permanent magnet array centering on a rotary shaft, the magnetic piece array may be configured as an annular magnetic piece array centering on the rotary shaft, and the magnetic detector may be disposed in a region around an axis of the rotary shaft. With this configuration, if the permanent magnet array is configured such that magnetic poles having the same polarity face each other, an inner magnetic field makes as many rotations as the number of the magnetic pieces when the magnetic piece array makes one rotation, and an inner magnetic field makes as many rotations as half the number of the permanent magnets when the permanent magnet array makes one rotation. Therefore, a high-resolution magnetic sensor can be formed with a simple structure. In addition, magnetism synthesized from a plurality of permanent magnets is detected. Therefore, the effect of an error for each magnet is only marginal, thereby achieving a high precision. The annular permanent magnet array and the annular magnetic piece array may be arranged in a radial direction of the rotary shaft. Alternatively, the annular permanent magnet array and the annular magnetic piece array may be arranged in an axial direction of the rotary shaft. In such cases, a pair of magnetic detectors may be disposed such that the directions of respective magnetic fluxes detected by the pair of magnetic detectors are 180° away from each other in terms of mechanical angle. In this case, a sinusoidal signal having a high S/N ratio can be obtained by connecting output portions of the pair of magnetic detectors to obtain a difference between outputs of the pair of magnetic detectors. In addition, it is possible to obtain a more accurate magnetic encoder that can cancel the effect of an external magnetic field and that is resistant to disturbance due to an external magnetic field.

If the permanent magnet array includes a plurality of permanent magnets arranged such that magnetic poles having different polarities face each other through a non-magnetic member interposed therebetween, the non-magnetic member may be air. This means that a gap is provided between two adjacent permanent magnets, and that the gap is used as the non-magnetic member.

BRIEF DESCRIPTION OF THE DRAWINGS

FIGS. 9A to 9H show modifications of a magnetic piece array.

FIGS. 13A and 13B show the magnetic flux densities detected by magnetic encoders of FIG. 12 and the waveforms of voltages output from the magnetic encoders of FIG. 12, respectively.

FIGS. 19A and 19B are a schematic front view and a schematic side view, respectively, of another embodiment in which the present invention is applied to a rotary magnetic encoder.

DESCRIPTION OF THE EMBODIMENTS

Figure 1:
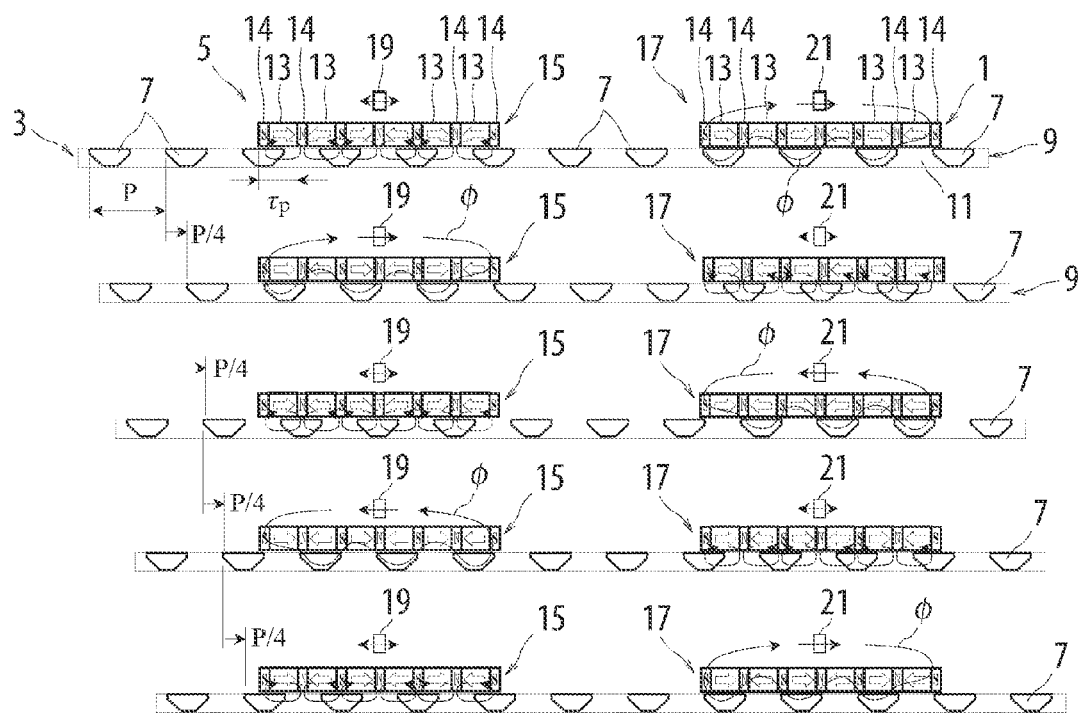
FIG. 1 illustrates operation of an embodiment in which the present invention is applied to a linear magnetic encoder.

Magnetic encoders according to a plurality of embodiments of the present invention will be described in detail below with reference to the drawings. In the drawings referenced in the following description, in order to clarify illustration, cross sections are not hatched excluding some exceptions.

FIG. 1 illustrates operation of an embodiment in which a magnetic encoder according to the present invention is applied to a linear magnetic encoder. In FIG. 1 illustrates operation of the linear magnetic encoder according to the embodiment chronologically from top to bottom. As shown in FIG. 1, a linear magnetic encoder 1 includes a mover 3 and a stator 5, and generates a signal indicating the position of the mover 3 with respect to the stator 5. The mover 3 has an integral structure in which one magnetic piece array 9 formed from a plurality of magnetic pieces 7 is supported by a support member 11 formed from a non-magnetic member. The magnetic pieces 7 each have a vertical cross-sectional shape similar to a trapezoid, and have a flat surface portion exposed from one surface of the support member 11. The magnetic pieces 7 are formed from a magnetic material such as silicon steel, for example. The support member 11 is formed from a material (such as aluminum, for example) having a magnetic resistance higher than that of the magnetic pieces 7. Such an integral structure facilitates manufacture and attachment of the magnetic piece array 9. In the embodiment, the pitch P of the magnetic pieces 7 corresponds to the sum of the length of each magnetic piece 7 in the direction of the magnetic piece array 9 and the length of a portion of the support member 11 between two adjacent magnetic pieces 7. In the embodiment, the pitch P of the magnetic pieces 7 is defined as 360° in terms of electrical angle. In the embodiment, the magnetic piece array 9 is formed as an integral component by insert molding using the plurality of magnetic pieces 7 as inserts. Although not shown, a bearing is provided at each of both ends of the mover 3 to slidably support the mover 3 such that the mover 3 is capable of linear motion but is not rotatable.

The stator 5 includes first and second permanent magnet arrays 15 and 17 each including a plurality of permanent magnets 13, and first and second magnetic detectors 19 and 21 provided in correspondence with the first and second permanent magnet arrays 15 and 17, respectively. In the embodiment, the first and second permanent magnet arrays 15 and 17 each include six permanent magnets 13 arranged such that magnetic poles having the same polarity face each other, and seven magnetic yokes 14 disposed on side surfaces of the six permanent magnets 13. The permanent magnets 13 and the magnetic yokes 14 are arranged side by side at a predetermined pitch τp in the moving direction of the mover 3. In the embodiment, the pitch τp of the permanent magnets 13 in the permanent magnet arrays 15 and 17 corresponds to the sum of the thickness of each permanent magnet 13 in the axial direction and the thickness of each magnetic yoke 14 in the axial direction. The magnetic yokes 14 are formed from a magnetic material such as iron. For example, the magnetic yokes 14 may each be formed by stacking a plurality of magnetic steel sheets made of silicon steel in the axial direction. Carbon steel, ferrite-based stainless steel, a pressed powder magnetic core, etc., may also be used as the material of the magnetic yokes 14.

The first and second magnetic detectors 19 and 21 corresponding to the first and second permanent magnet arrays 15 and 17 are integrated by a resin molding portion (not shown) in such positional relationship allowing detection of that leakage magnetic flux generated when the permanent magnet arrays 15 and 17 and the magnetic piece array 9 are displaced with respect to each other. The magnetic detectors 19 and 21 may each be a Hall sensor (that can discriminate between N pole and S pole), or a magnetic resistance element (that cannot discriminate between N pole and S pole).

If the permanent magnet arrays 15 and 17 are arranged such that the magnetic yokes 14 are located on both sides of each of the plurality of permanent magnets 13 as in the embodiment, it is possible to efficiently enhance flow of magnetic flux. Further, it is possible to reduce a repulsive force generated when the permanent magnets 13 of the same polarity are caused to face each other. This facilitates manufacturing the permanent magnet arrays 15 and 17.

Figure 2A:
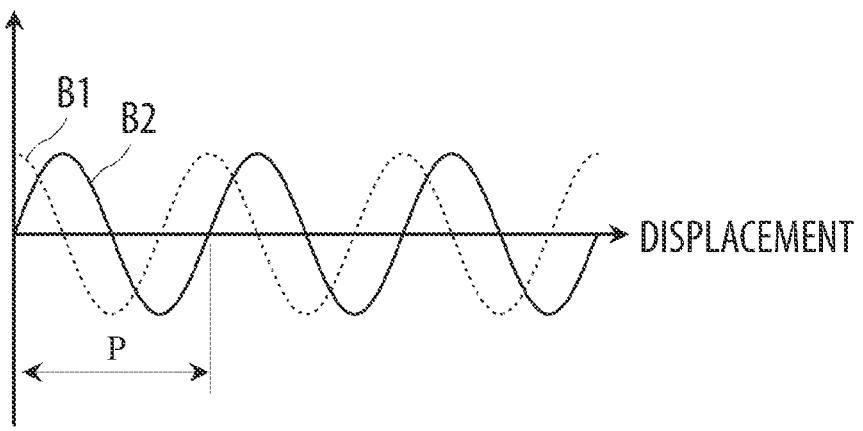
FIG. 2A shows the magnetic flux densities detected by magnetic detectors of FIG. 1.

The mover 3 and the stator 5 of the encoder may be installed in a mover and a stator, respectively, of a linear motor, for example, such that the permanent magnets 13 and the magnetic pieces 7 face each other with a predetermined gap between each other. In FIG. 1, arrows in the permanent magnets 13 indicate the direction of magnetization. In addition, thin arrows indicate the flow of magnetic flux (magnetic path) generated when the mover 3 is moved with respect to the stator 5. In the embodiment, the pitch $\tau p$ of the plurality of permanent magnets 13 and the pitch P of the plurality of magnetic pieces 7 are determined to form a magnetic path in which magnetic flux emitted from one of the permanent magnets 13 in the permanent magnet arrays 15 and 17 passes through one of the magnetic pieces 7 that faces the permanent magnet 13 adjacent to the one permanent magnet 13 and returns to the permanent magnet arrays 15 and 17 when the permanent magnet arrays 15 and 17 and the magnetic piece array 9 are continuously displaced with respect to each other. Specifically, in the embodiment with numerical limitations, when the pitch P of the magnetic pieces 7 is defined as P=360° in terms of electrical angle, the pitch $\tau p$ is determined to satisfy $\tau p = P/2$. The first permanent magnet array 15 and the second permanent magnet array 17 are magnetically offset by a pitch of P/4 from each other. That is, the positional relationship between the first permanent magnet array 15 and the first magnetic detector 19 and the second permanent magnet array 17 and the second magnetic detector 21 is determined such that the magnetic flux density B1 of leakage magnetic flux detected by the first magnetic detector 19 and the magnetic flux density B2 of leakage magnetic flux detected by the second magnetic detector 21 are offset by a phase of 90° in terms of electrical angle as shown in FIG. 2A. As a result, according to the embodiment, a magnetic encoder that outputs a two-phase sinusoidal wave can be obtained.

FIG. 1 illustrates magnetic flux generated when the magnetic piece array 9 is sequentially moved by P/4 at a time. The first row of FIG. 1 illustrates that two adjacent permanent magnets 13 in the first permanent magnet array 15 equally face one magnetic piece 7, and generated magnetic flux $\phi$ forms a short magnetic path that passes between one permanent magnet 13 and one magnetic piece 7. At this time, in the second permanent magnet array 17, one magnetic piece 7 perfectly faces one permanent magnet 13, and generated synthesized magnetic flux $\phi$ forms a magnetic path in which magnetic flux emitted from one permanent magnet 13 passes through one magnetic piece 7 that faces the permanent magnet 13 adjacent to the one permanent magnet 13 and returns to the permanent magnet array 17. The second row of FIG. 1 illustrates that the mover 3 has been moved by a pitch of P/4. In the first permanent magnet array 15, one magnetic piece 7 perfectly faces one permanent magnet 13 and generated synthesized magnetic flux $\phi$ forms a magnetic path in which magnetic flux emitted from one permanent magnet 13 passes through one magnetic piece 7 that faces the permanent magnet 13 adjacent to the one permanent magnet 13 and returns to the permanent magnet array 15. In the second permanent magnet array 17, two adjacent permanent magnets 13 equally face one magnetic piece 7, and generated magnetic flux $\phi$ forms a short magnetic path that passes through one permanent magnet 13 and one magnetic piece 7. The third row of FIG. 1 illustrates that the mover 3 has been further moved by a pitch of P/4, and synthesized magnetic flux $\phi$ that passes through the second permanent magnet array 17 forms a magnetic path that flows in the direction opposite to that in the state of the first row. The fourth row of FIG. 1 illustrates that the mover 3 has been further moved by a pitch of P/4, and synthesized magnetic flux $\phi$ that passes through the first permanent magnet array 15 forms a magnetic path that flows in the direction opposite to that in the state of the second row. The fifth row of FIG. 1 illustrates that the mover 3 has been further moved by a pitch of P/4, returning to and the state of the first row. Then, a magnetic path is formed in which the magnetic flux $\phi$ flows in the direction opposite to that in the state of the second row.

Figure 2B:
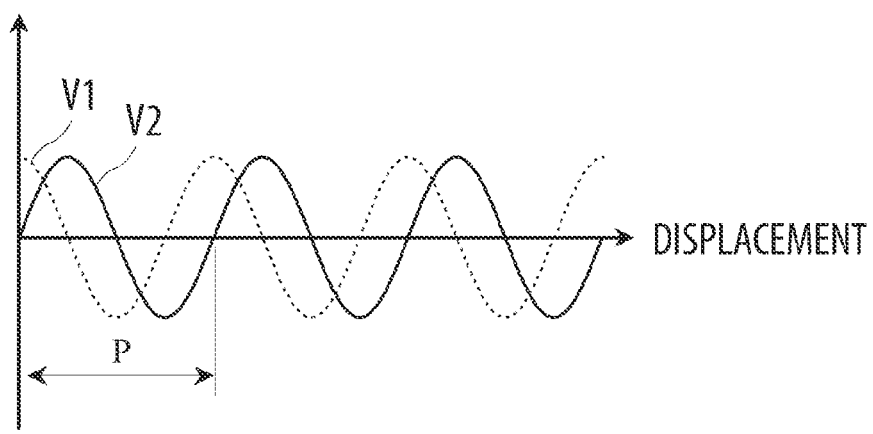
FIG. 2B shows the waveforms of voltages output from the magnetic detectors.

In FIG. 2A, when the magnetic flux density B1 or B2 is 0, one magnetic piece 7 perfectly faces one permanent magnet 13. When the magnetic flux density B1 or B2 is approaching its peak or approaching 0 from its peak, magnetic flux emitted from one permanent magnet 13 passes through one magnetic piece 7 that faces the permanent magnet 13 adjacent to the one permanent magnet 13 and returns to the permanent magnet array 15 so that magnetic fluxes from the plurality of permanent magnets 13 are synthesized to form a magnetic path. FIG. 2B shows the waveforms of voltages output from the first and second magnetic detectors 19 and 21 when the magnetic fluxes of FIG. 2A are generated. The effect of one permanent magnet 13 can be reduced by increasing the number of the permanent magnets 13, allowing generation of sinusoidal magnetic flux with little distortion. By detecting leakage magnetic flux due to the generated magnetic flux using the magnetic detectors 19 and 21, sinusoidal signals can be obtained without requiring a special correcting circuit. By processing the sinusoidal signals using a technology known in the art, a signal indicating the position of the mover 3 with respect to the stator 5 can be obtained. As a result, according to the embodiment, it is possible to improve the resolution and the interpolation accuracy of the linear magnetic encoder. The permanent magnet array 15 is formed of two or more permanent magnets 13 (that may be physically separated from or integrated with each other) to include at least two or more magnetic poles. As the number of poles of the permanent magnets 13 in the permanent magnet arrays 15 and 17 facing the magnetic piece array 9 is increased, the detected magnetic flux approaches an accurate sinusoidal wave, thereby increasing accuracy. Even if there are variations in position and characteristics of the permanent magnets 13, the magnetic yokes 14, and the magnetic pieces 7, smoothened output can be obtained.

Figure 3A:
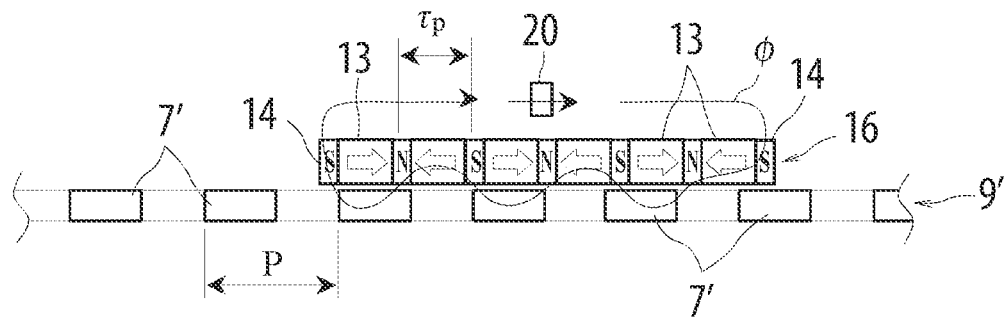
FIG. 3A shows the relationship between the pitch τp of permanent magnets and the pitch P of magnetic pieces for P/2<τp<P.
Figure 3B:
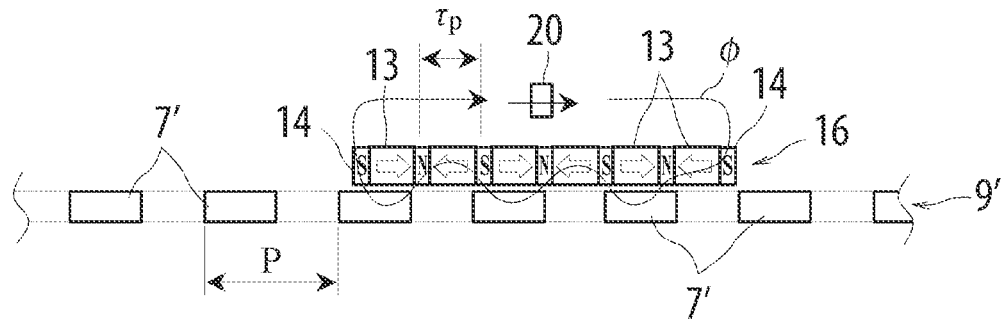
FIG. 3B shows the relationship between the pitch τp of the permanent magnets and the pitch P of the magnetic pieces for P/4<τp<P/2.

The pitch τp (electrical angle) of the permanent magnets 13 preferably satisfies P/4<τp<P. FIG. 3A shows the relationship between the pitch τp of the permanent magnets 13 and the pitch P of magnetic pieces 7' for P/2<τp<P, and FIG. 3B shows the relationship between the pitch τp of the permanent magnets 13 and the pitch P of the magnetic pieces 7' for P/4<τp<P/2. In FIGS. 3A and 3B, only one permanent magnet array 16 is shown, and only one magnetic detector 20 is shown. In FIGS. 3A and 3B, the magnetic pieces 7' have a rectangular cross-sectional shape.

Figure 4A:
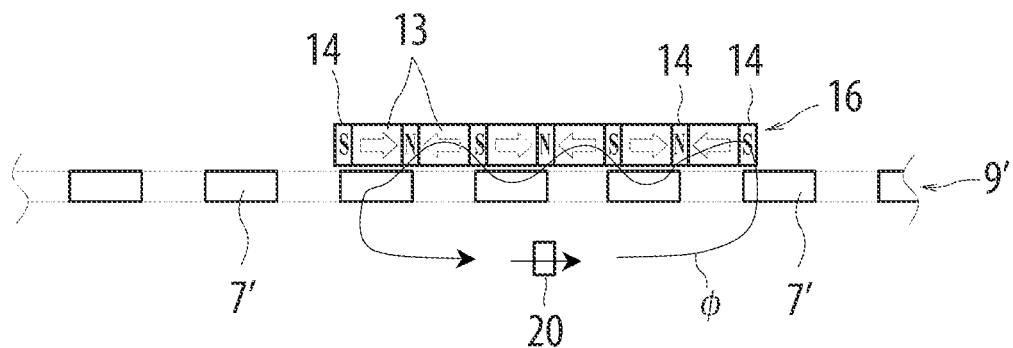
FIGS. 4A to 4D each show the installation position of the magnetic detector.
Figure 4B:
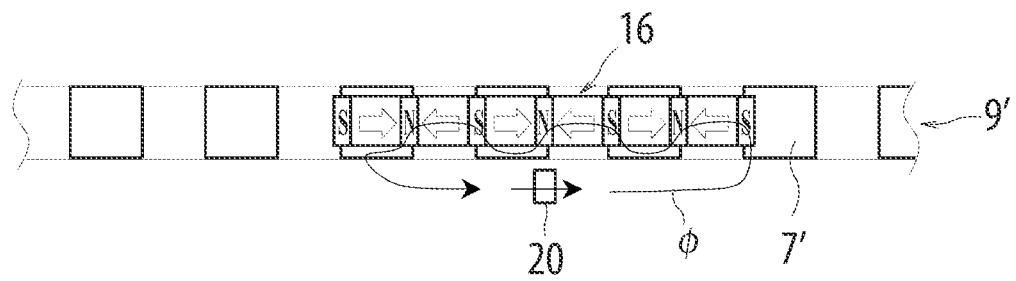
Figure 4C:
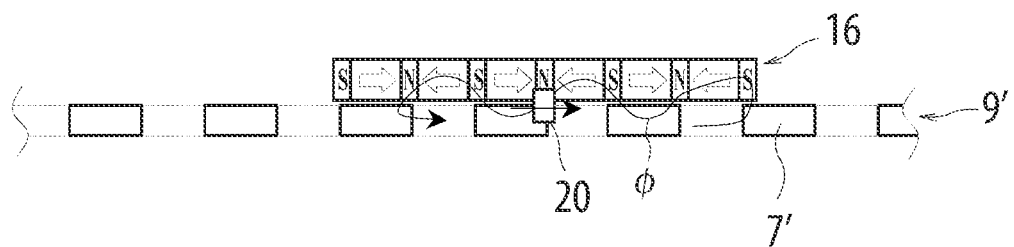
Figure 4D:
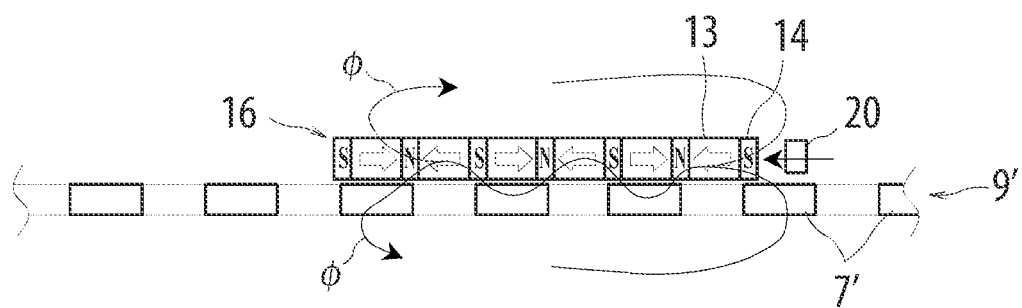

The magnetic detector 20 may be disposed at any position as long as leakage magnetic flux can be detected. For example, the magnetic detector 20 may be disposed to face the permanent magnet array 16 with a magnetic piece array 9' interposed therebetween to detect leakage magnetic flux φ as shown in FIG. 4A. Alternatively, the magnetic detector 20 may be disposed to face both the magnetic piece array 9' and the permanent magnet array 16 to detect leakage magnetic flux φ as shown in FIGS. 4B and 4C. Further, the magnetic detector 20 may be disposed adjacent to the magnetic yoke 14 on an extension line of the permanent magnet array 16 to detect leakage magnetic flux φ. Magnetic flux φ can be reliably detected at such positions.

Figure 5:
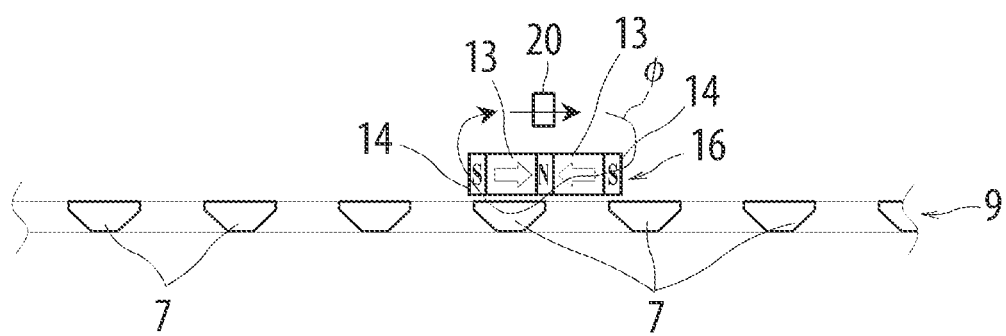
FIG. 5 shows a schematic configuration of a linear magnetic encoder according to another embodiment.

The permanent magnet array may include two or more permanent magnets. FIG. 5 shows an embodiment in which the permanent magnet array 16 includes two permanent magnets 13. Also in the permanent magnet array 16, the two permanent magnets 13 are arranged such that magnetic poles having the same polarity face each other, and the magnetic yokes 14 are disposed on both sides of each of the permanent magnets 13. If two poles are provided by the permanent magnets 13 as in the embodiment, a low-cost magnetic encoder can be provided.

Figure 6:
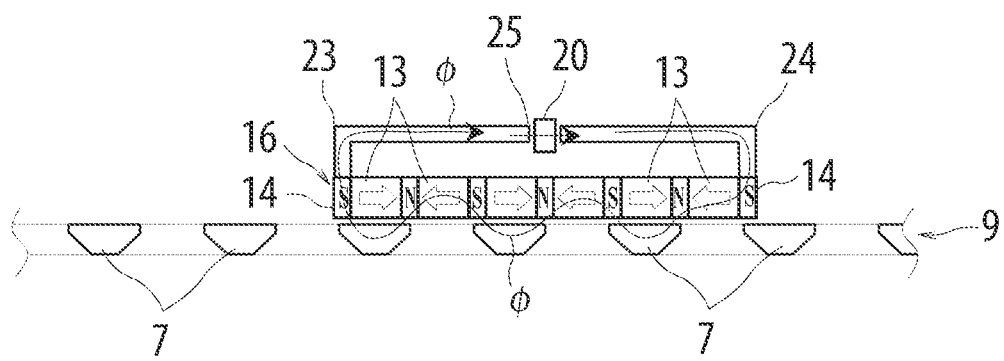
FIG. 6 shows a schematic configuration of a linear magnetic encoder according to another embodiment.

As shown in FIG. 6, coupling yokes 23 and 24 may be provided to magnetically couple the two magnetic yokes 14 located on both ends of the permanent magnet array 16 to collect leakage magnetic flux φ from the permanent magnet array 16. First ends of the coupling yokes 23 and 24 are coupled to the corresponding magnetic yokes 14, and second ends of the coupling yokes 23 and 24 face each other via a gap 25. The magnetic detector 20 is disposed in the gap 25. If such a structure is used, the magnetic detector 20 detects leakage magnetic flux φ that passes through the coupling yokes 23 and 24. Use of the coupling yokes 23 and 24 enhances the intensity of magnetic flux detected by the magnetic detector 20, providing higher sensitivity and improving accuracy and resolution.

Figure 7:
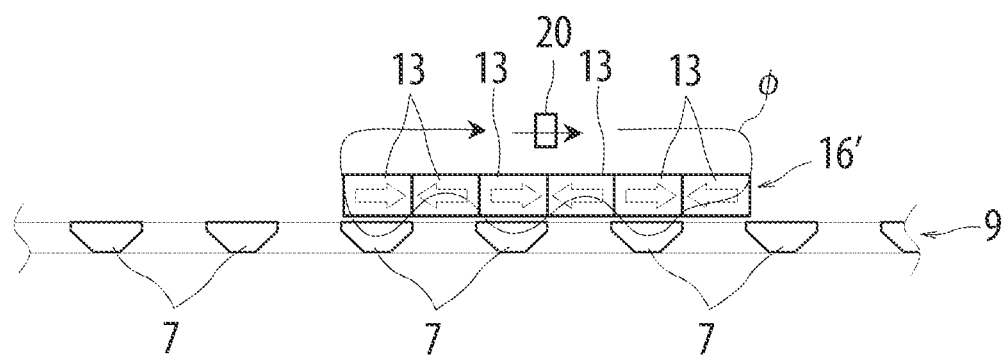
FIG. 7 shows a schematic configuration of a linear magnetic encoder according to another embodiment.

As shown in FIG. 7, a permanent magnet array 16' may include only the permanent magnets 13. That is, even if the magnetic yokes 14 are not used, variations in magnetic resistance are caused, allowing the magnetic encoder to fully function.

Figure 8A:
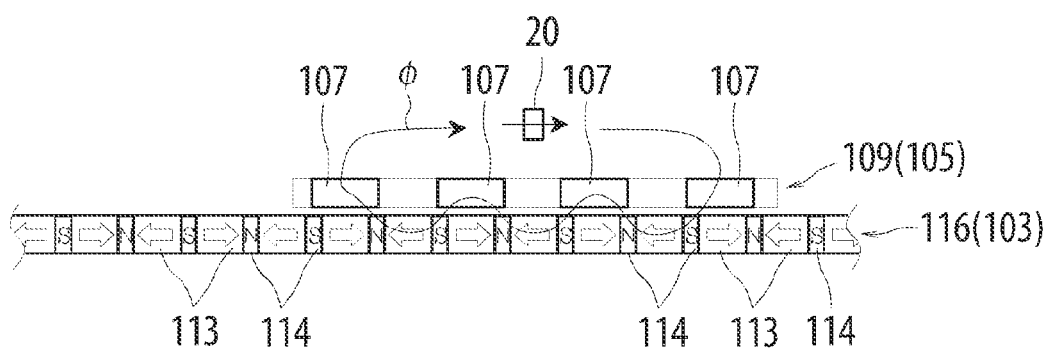
FIGS. 8A and 8B each show a schematic configuration and operation of a linear magnetic encoder according to another embodiment.
Figure 8B:
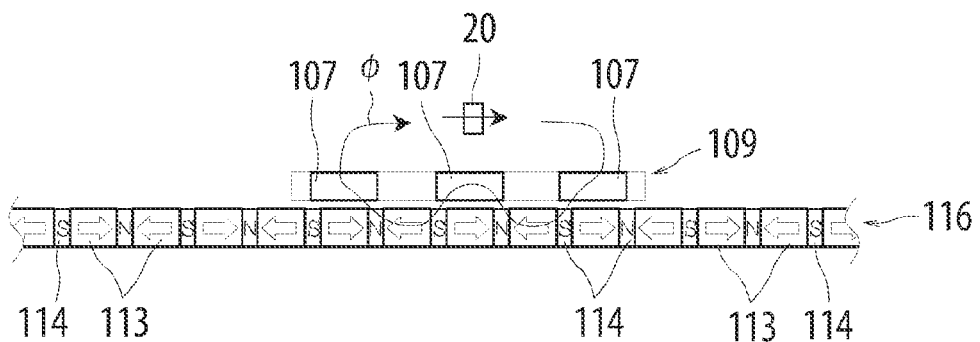

As shown in FIGS. 8A and 8B, the length of a permanent magnet array 116 may be larger than the length of a magnetic piece array 109. In the embodiment, the permanent magnet array 116 forms a mover 103, and the magnetic piece array 109 and the magnetic detector 20 form a stator 105. In this case, the number of magnetic pieces 107 included in the magnetic piece array 109 may be even as shown in FIG. 8A, or may be odd as shown in FIG. 8B. In the embodiment, it is a matter of course that the permanent magnet array 116 may be used as a stator and the magnetic piece array 109 and the magnetic detector 20 may be used as a mover.

The plurality of magnetic pieces forming the magnetic piece array may have any profile as seen from the permanent magnet side as long as sinusoidal magnetic flux is obtained. In addition, the permanent magnets forming the permanent magnet array may have any shape as long as sinusoidal magnetic flux is obtained.

Figure 9A:
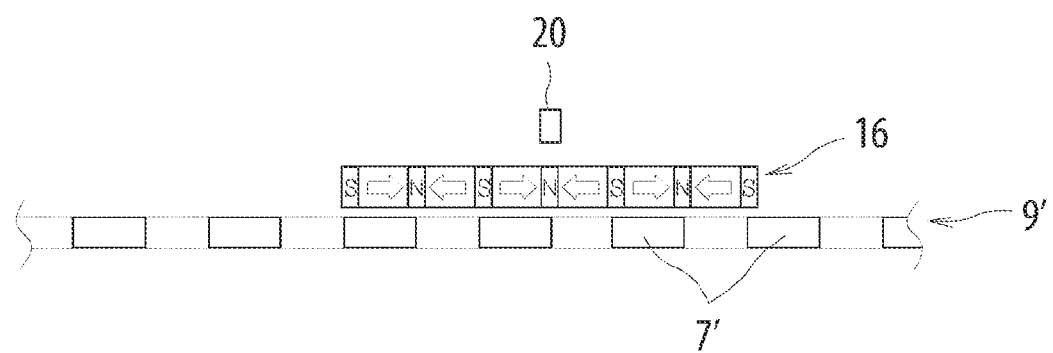

FIGS. 9A to 9H show modifications of the magnetic pieces and modifications of the permanent magnets. FIG. 9A shows the one same as the magnetic piece array 9' shown in FIGS. 3 and 4. In the magnetic piece array 9', the magnetic pieces 7' have a rectangular profile as seen from the permanent magnet array 16 side and a rectangular vertical cross-section. Such flat magnetic pieces 7' do not have to be chamfered unlike the magnetic pieces 7 used in the embodiment of FIG. 1, thereby improving the productivity of the magnetic piece array.

Figure 9B:
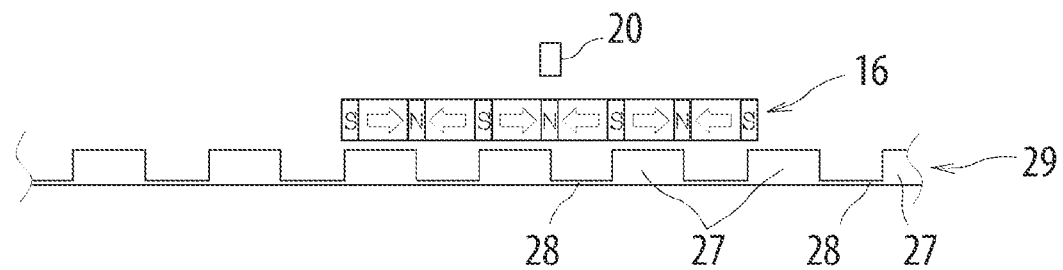

A magnetic piece array 29 shown in FIG. 9B has a structure in which a plurality of magnetic pieces 27 are coupled to each other by coupling pieces 28. The thus structured magnetic piece array 29 can be integrally formed from the magnetic pieces 27 and the coupling pieces 28 by casting, pressing, etc., improving productivity.

Figure 9C:
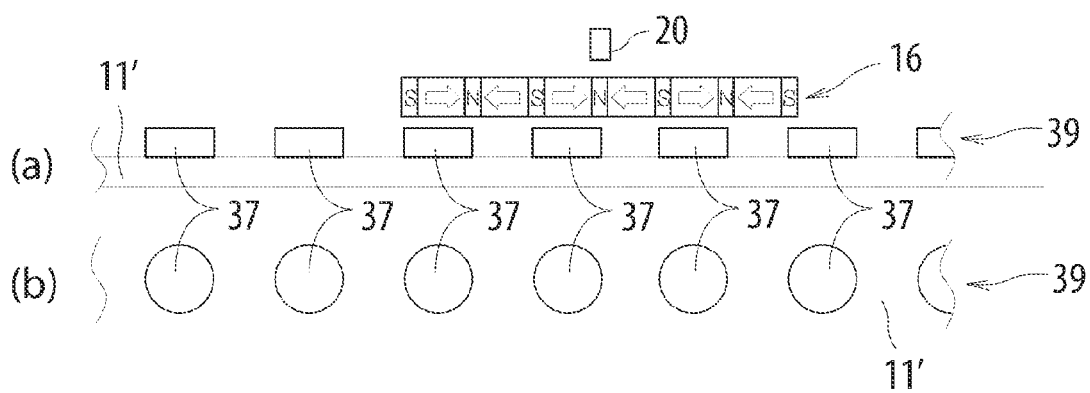

Magnetic pieces 37 shown in (a) and (b) of FIG. 9C have a circular profile as seen from the permanent magnet array 16 side. The plurality of circular magnetic pieces 37 are bonded onto a long-length support member 11' to form a magnetic piece array 39.

Figure 9D:
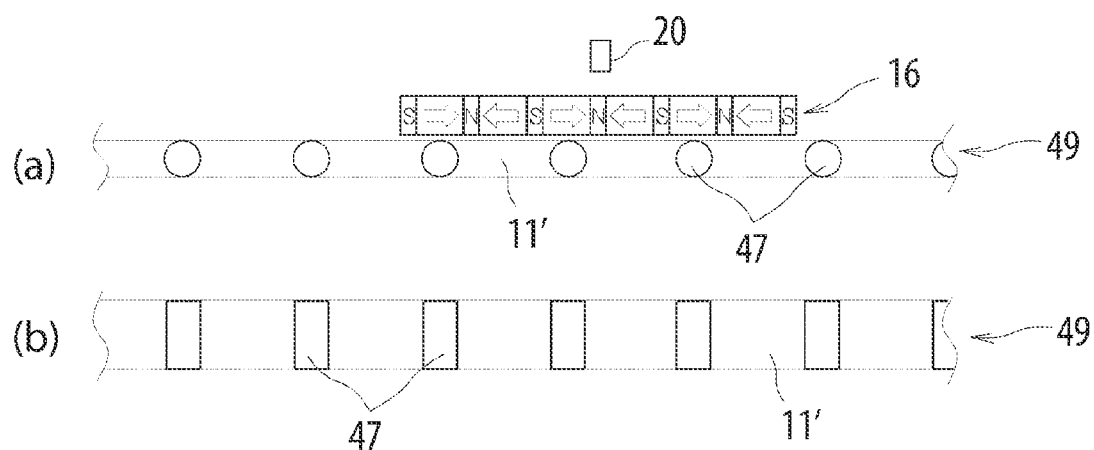

Magnetic pieces 47 shown in (a) and (b) of FIG. 9D have a columnar shape having a rectangular profile as seen from the permanent magnet array 16 side but having a circular shape as seen from a side. The plurality of columnar magnetic pieces 47 are supported as embedded in the support member 11' to form a magnetic piece array 49.

Magnetic pieces 57 shown in FIG. 9E have a spherical shape. The plurality of spherical magnetic pieces 57 are supported as embedded in the support member 11' to form a magnetic piece array 59.

Magnetic pieces 67 shown in (a) and (b) of FIG. 9F have a columnar shape having a rectangular profile as seen from the permanent magnet array 16 side but having a circular shape as seen in the longitudinal direction of a magnetic piece array 69. The plurality of columnar magnetic pieces 67 are arranged in the longitudinal direction to be supported by the support member 11' to form the magnetic piece array 69.

Figure 9G:
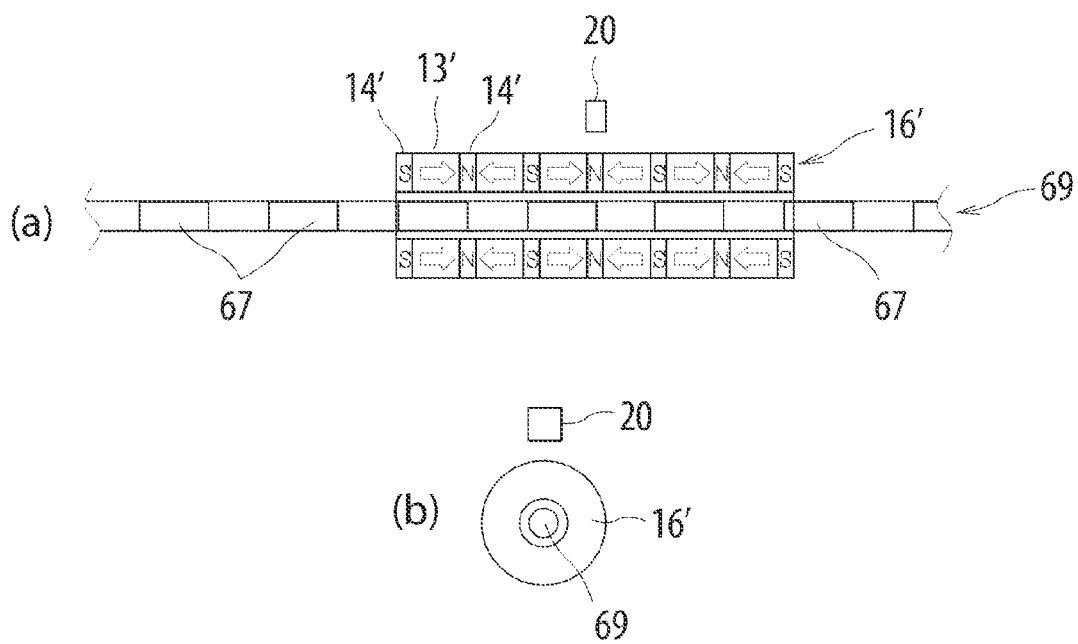

Permanent magnets 13' and magnetic yokes 14' shown in (a) and (b) of FIG. 9G have an annular shape, and the plurality of permanent magnets 13' and the plurality of magnetic yokes 14' are alternately joined to each other to form a cylindrical permanent magnet array 16'. Magnetic pieces 67 have a columnar shape having a rectangular profile as seen from the permanent magnet array 16' side but having a circular shape as seen in the longitudinal direction of the magnetic piece array 69. The plurality of columnar magnetic pieces 67 are arranged in the longitudinal direction to be supported by the support member 11' to form the magnetic piece array 69.

Figure 9H:
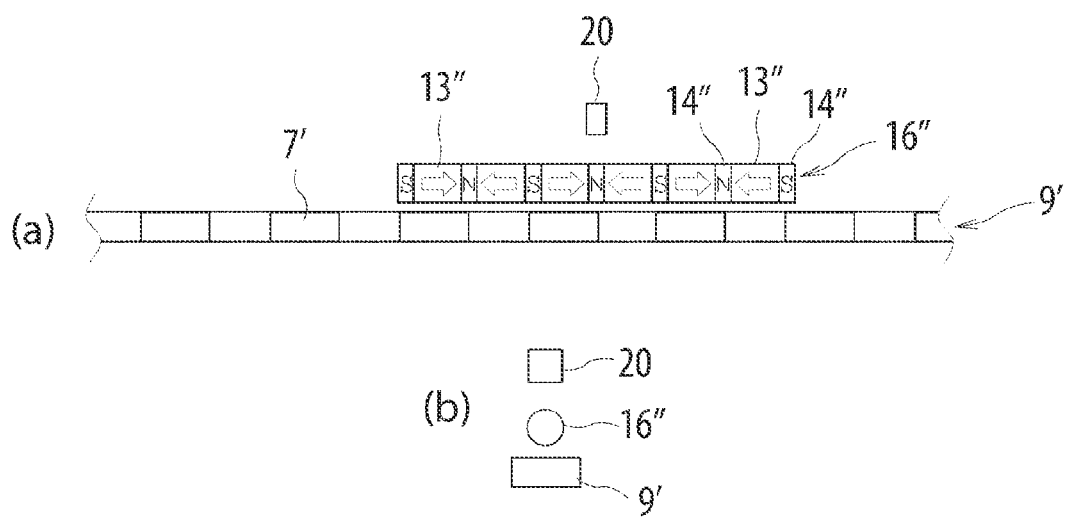

Permanent magnets 13" and magnetic yokes 14" shown in (a) and (b) of FIG. 9H have a columnar shape, and the plurality of permanent magnets 13" and the plurality of magnetic yokes 14" are alternately joined to each other to form a columnar permanent magnet array 16". The magnetic piece array 9' is the same as that in FIG. 9A.

Figure 10A:
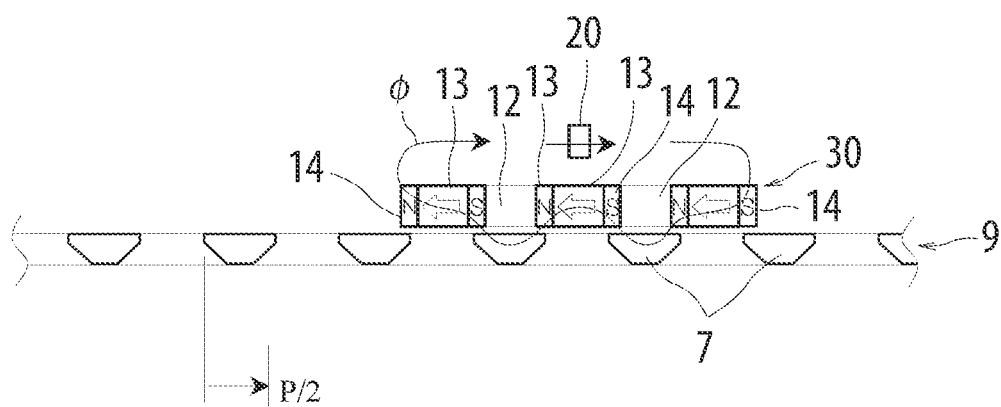
FIGS. 10A and 10B show a schematic configuration of a linear magnetic encoder according to another embodiment in which magnetic yokes are not used.
Figure 10B:
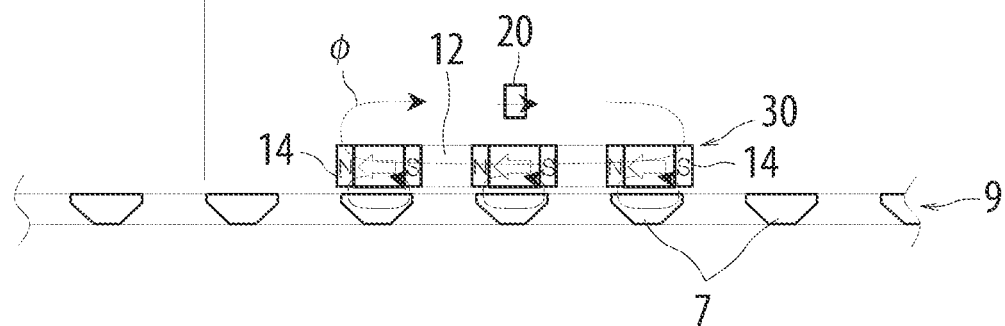
Figure 11A:
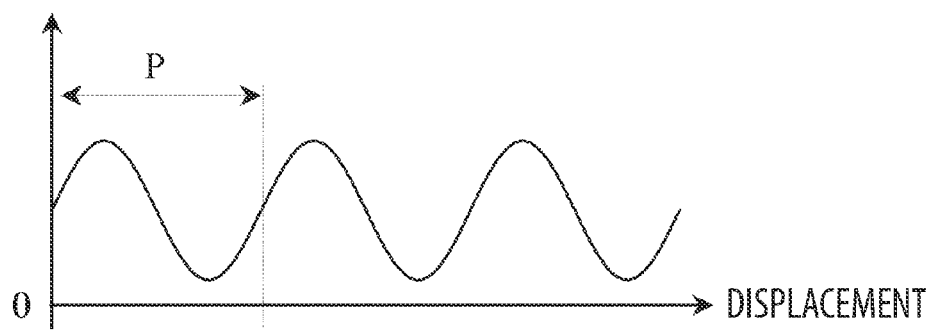
FIGS. 11A and 11B show the magnetic flux density detected by a linear magnetic encoder of FIG. 10 and the waveform of a voltage output from the linear magnetic encoder of FIG. 10, respectively.
Figure 11B:
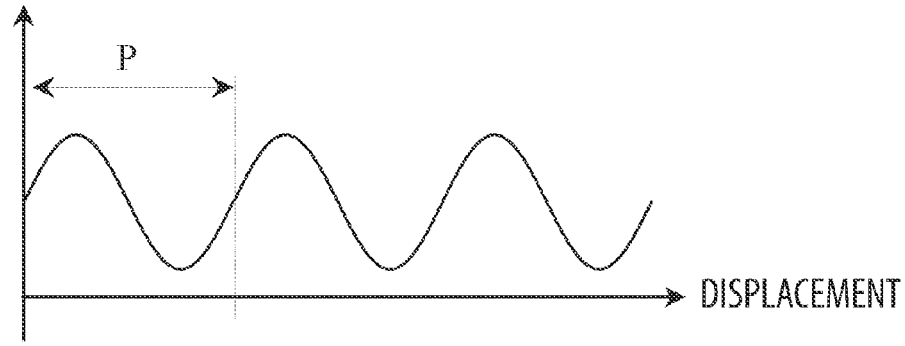

FIGS. 10A and 10B show a magnetic encoder according to an embodiment that uses a permanent magnet array 30 including a plurality of permanent magnets 13 arranged such that magnetic poles having different polarities face each other through a non-magnetic member 12 interposed therebetween and magnetic yokes 14 disposed on both sides of each of the permanent magnets 13, respectively showing states before and after the magnetic piece array 9 is moved by a pitch of P/2. The non-magnetic member 12 may be formed from aluminum, for example. The permanent magnet array 30 may be formed by insert molding using the plurality of permanent magnets 13 as inserts. The non-magnetic member 12 may be air. In the embodiment, the magnetic detector 20 may be a Hall sensor or a magnetic resistance element (MR sensor). Magnetic flux is offset so as to have the same polarity. Therefore, the accuracy can be improved in particular if the MR element is utilized. FIG. 11A shows the magnetic flux density of leakage magnetic flux φ detected by the magnetic detector 20, and FIG. 11B shows variations in output from (electric resistance detected by) the MR element. The phase of the magnetic flux density is the same as the phase of the electric resistance. In the embodiment, the permanent magnet array 30 may be formed from the permanent magnets 13 and the non-magnetic member 12 without using magnetic yokes.

Figure 12A:
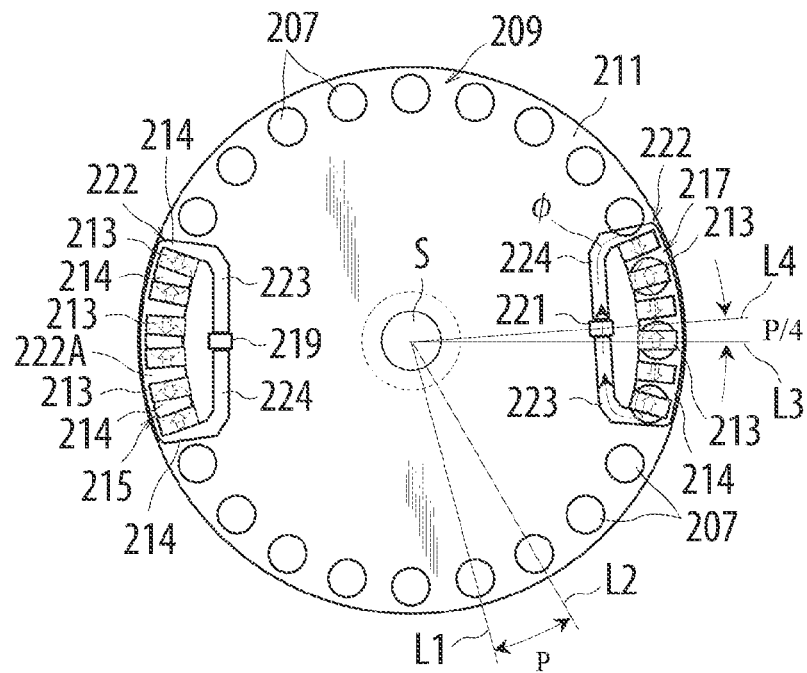
FIGS. 12A and 12B are a schematic front view and a schematic side view, respectively, of an embodiment in which the present invention is applied to a rotary magnetic encoder.
Figure 12B:
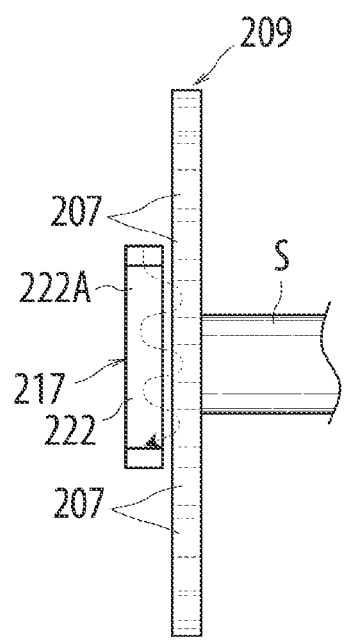

FIGS. 12A and 12B are a schematic front view and a schematic side view, respectively, of an embodiment in which the present invention is applied to a rotary magnetic encoder. In the embodiment, a magnetic piece array 209 including a plurality of columnar magnetic pieces 207 is fixed to a circular plate 211 along the outer peripheral surface of the circular plate 211 to form an annular array. The circular plate 211 is configured to be directly or indirectly rotated by rotation of a rotary shaft S. The circular plate 211 is formed from a non-magnetic material such as aluminum. In the embodiment, the pitch P of the magnetic pieces 207 is defined as the angle between imaginary lines L1 and L2 extending from the center axis of the rotary shaft S to the centers of two adjacent magnetic pieces 207. In the embodiment, two permanent magnet arrays 215 and 217 are disposed to arcuately extend to face the magnetic piece array 209. The permanent magnet array 217 is described as an example. The pitch τp of the permanent magnets 213 is defined as the angle between an imaginary line L3 extending from the center axis of the rotary shaft S to the center of the permanent magnet 213 and an imaginary line L4 extending from the center axis of the rotary shaft S to the center of a magnetic yoke 214 located between two permanent magnets 213. In the embodiment, the pitch P of the magnetic pieces and the pitch τp of the permanent magnets are determined such that the relationship τp=P/4 is established. The plurality of permanent magnets 213 are insert-molded in a yoke forming member 222 formed from a magnetic material. The yoke forming member 222 includes a permanent magnet holding portion 222A that holds the permanent magnets 213, and coupling yokes 223 and 224 integrally provided at both ends of the permanent magnet holding portion 222A. As with the coupling yokes 23 and 24 shown in FIG. 6, the coupling yokes 223 and 224 function to collect leakage magnetic flux φ from the permanent magnet arrays 215 and 217 onto magnetic detectors 219 and 221.

In the embodiment, the positions of the magnetic detectors 219 and 221 and the pitch P of the magnetic pieces and the pitch τp of the permanent magnets are determined such that the magnetic flux density B1 of magnetic flux detected by the magnetic detector 219 and the magnetic flux density B2 of magnetic flux detected by the magnetic detector 221 when the rotary shaft S is rotated form sinusoidal waves offset by a phase of 90° in terms of electrical angle as shown in FIG. 13A. As a result, sinusoidal voltages V1 and V2 offset by a phase of 90° in terms of electrical angle are output from the magnetic detectors 219 and 221, respectively. The sinusoidal voltages V1 and V2 are processed using a signal processing technology known in the art to obtain a signal indicating the rotational position of the rotary shaft S. In the embodiment, the permanent magnet holding portion 222A of the yoke forming member 222 is thick. However, the permanent magnet holding portion 222A may be thin.

Figure 14A:
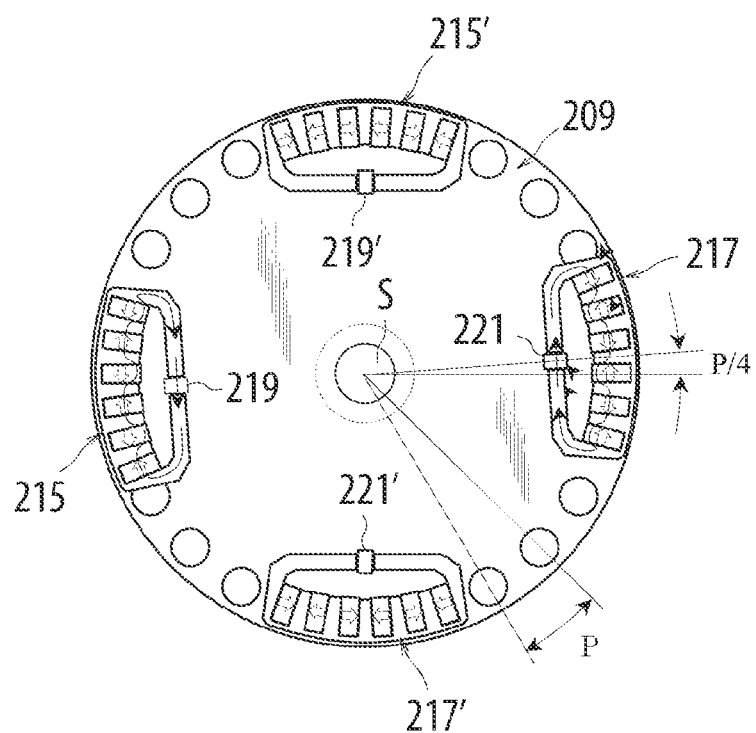
FIGS. 14A and 14B are a schematic front view and a schematic side view, respectively, of another embodiment in which the present invention is applied to a rotary magnetic encoder.
Figure 14B:
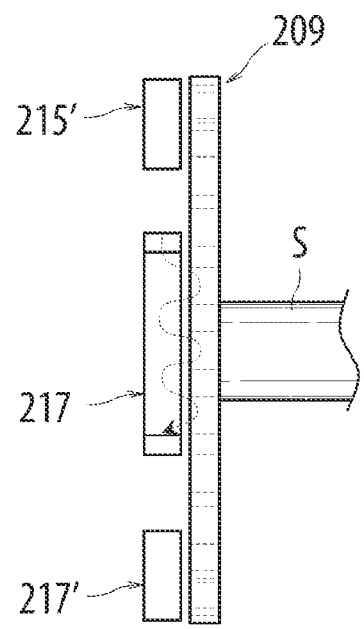
Figure 15A:
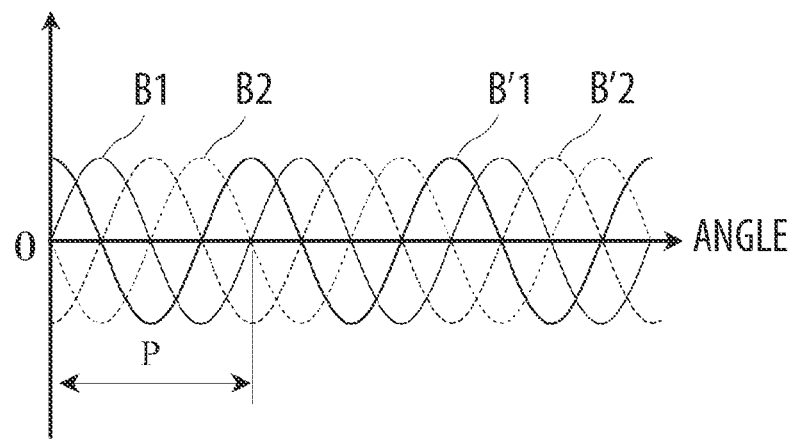
FIGS. 15A and 15B show the magnetic flux densities detected by magnetic encoders of FIG. 14 and the waveforms of voltages output from the magnetic encoders of FIG. 14, respectively.
Figure 15B:
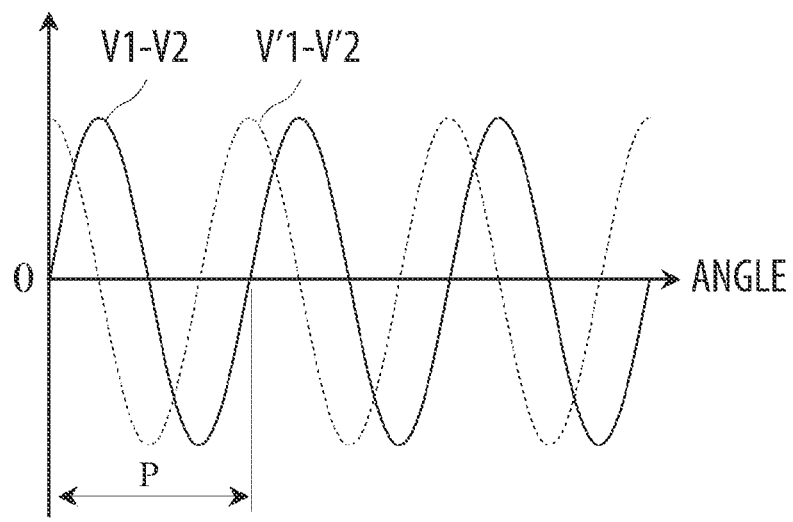

In FIGS. 14A and 14B, not only the pair of permanent magnet arrays 215 and 217 but also another pair of permanent magnet arrays 215' and 217' are provided. The pair of magnetic detectors 219 and 221 provided in correspondence with the pair of permanent magnet arrays 215 and 217 and a pair of magnetic detectors 219' and 221' provided in correspondence with the pair of permanent magnet arrays 215' and 217' are disposed to be offset by a mechanical angle of 180°. The magnetic detectors 219 and 221 and 219' and 221' may each be a Hall sensor. In the embodiment, one of each pair of magnetic detectors (Hall sensors) is disposed to detect magnetic flux in the opposite direction. The magnetic flux densities B1, B2, B'1, and B'2 of magnetic fluxes detected by the magnetic detectors 219, 221, 219', and 221' in this state are as shown in FIG. 15A. A difference (V1–V2) between outputs of the magnetic detector 219 and the magnetic detector 221 and a different (V'1–V'2) between outputs of the magnetic detector 219' and the magnetic detector 221' obtained in this state are as shown in FIG. 15B. Thus, a voltage signal having a high S/N ratio can be obtained by connecting output portions of the pair of magnetic detectors to obtain a difference between outputs of the pair of magnetic detectors. In addition, a more accurate magnetic encoder that can cancel the effect of an external magnetic field and that is resistant to disturbance due to an external magnetic field can be obtained. Also in this case, when the pitch P of the magnetic pieces is defined as P=360° in terms of electrical angle, the pitch τp of the permanent magnets preferably satisfies P/4<τp<P. In addition, magnetic yokes are preferably disposed on both sides of each of the plurality of permanent magnets.

Figure 16:
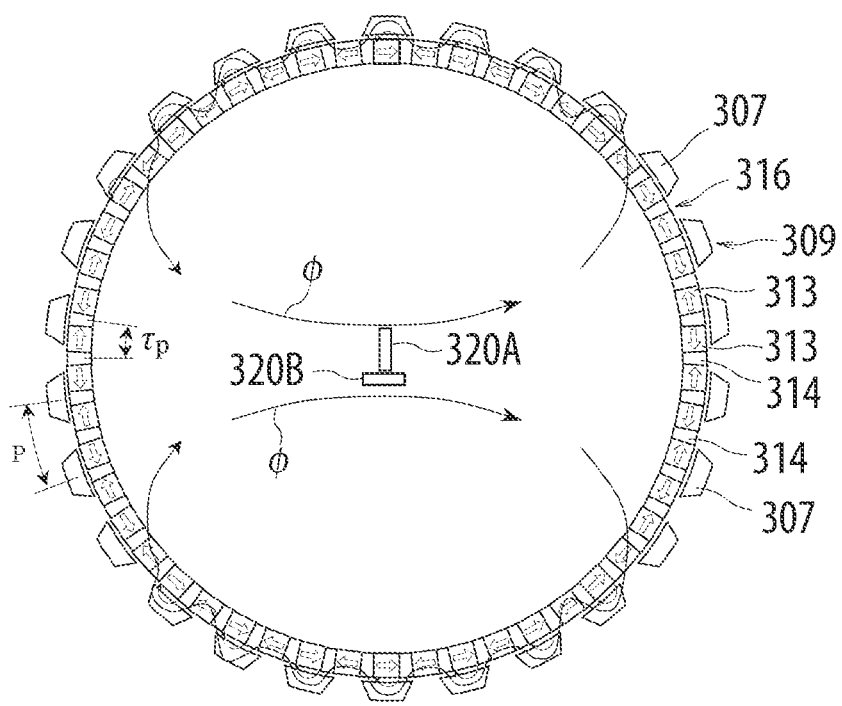
FIG. 16 is a schematic front view of another embodiment in which the present invention is applied to a rotary magnetic encoder.

FIG. 16 shows the configuration of still another embodiment of the present invention. In the embodiment, 2×n (in the embodiment, n=25) permanent magnets 313 and 2×n magnetic yokes 314 are alternately arranged such that magnetic poles having the same polarity face each other to form an annular permanent magnet array 316. In addition, n±m (m is a natural number less than n; in the embodiment, m=1) magnetic pieces 307 are arranged at a pitch P to form an annular magnetic piece array 309. Specifically, the number of the permanent magnets 313 is 50, and the number of the magnetic pieces 307 is 26. The permanent magnet array 316 and the magnetic piece array 309 are concentrically disposed such that the magnetic piece array 309 is located on the outer side. Although not shown, the permanent magnet array 316 and the magnetic piece array 309 are integrated with each other, being supported by a support member. One of the permanent magnet array 316 and the magnetic piece array 309 is directly or indirectly fixed to a rotary shaft, the rotational position of which is to be detected. In the embodiment, the magnetic piece array 309 is rotatable. Magnetic detectors 320A and 320B are disposed in the center region of the permanent magnet array 316, that is, a region around the axis of a rotary shaft (not shown). The magnetic detectors 320A and 320B are disposed in such positional relationship that a phase difference of 90° is caused in their outputs. In the embodiment, the permanent magnet array 316 and the magnetic detectors 320A and 320B are supported by the same support member.

Figure 17A:
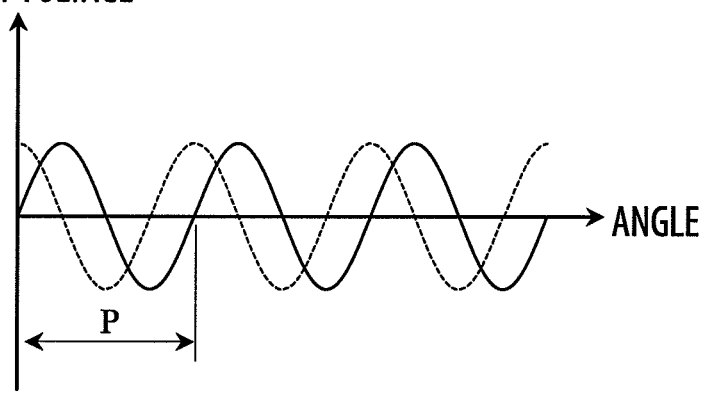
FIGS. 17A and 17B show the magnetic flux densities detected by magnetic encoders of FIG. 16 and the waveforms of voltages output from the magnetic encoders of FIG. 16, respectively.

If the plurality of permanent magnets 313 are arranged such that magnetic poles having the same polarity face each other to form the annular permanent magnet array 316 as in the embodiment, inside magnetic fields (leakage magnetic flux φ) make as many rotations as the number of the magnetic pieces 307 when the magnetic piece array 309 makes one rotation. Thus, in the embodiment, the two inside magnetic fields (leakage magnetic flux φ) make 26 rotations around the axis of a rotary shaft (not shown). The principle of rotation of a magnetic field is described in detail in Japanese Patent Application No. 2010-220070 previously filed by the applicant. The magnetic detectors 320A and 320B detect the two rotating magnetic fields (leakage magnetic flux φ) to output signals. FIG. 17A shows the magnetic flux density detected by the magnetic detector 320A and the voltage output from the magnetic detector 320A, and the magnetic flux density detected by the magnetic detector 320B and the voltage output from the magnetic detector 320B when the magnetic piece array 309 is rotated.

Figure 17B:
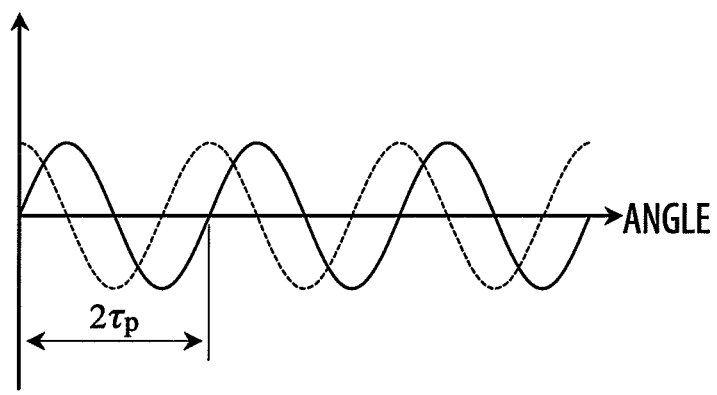

In the configuration according to the embodiment, if the permanent magnet array 316 is rotatable and the magnetic piece array 309 is fixed, an inner magnetic field makes as many rotations as half the number of the permanent magnets 316 (that is, 25 rotations), when the permanent magnet array 316 makes one rotation. FIG. 17B shows the magnetic flux density detected by the magnetic detector 320A and the voltage output from the magnetic detector 320A and the magnetic flux density detected by the magnetic detector 320B and the voltage output from the magnetic detector 320B when the permanent magnet array 316 is rotated.

Figure 18:
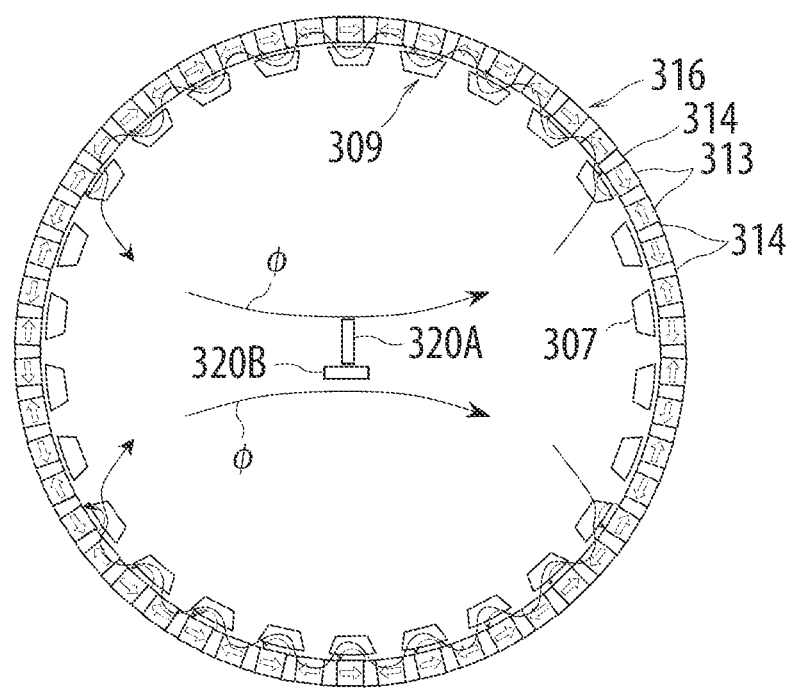
FIG. 18 is a schematic front view of another embodiment in which the present invention is applied to a rotary magnetic encoder.

According to the embodiment, a high-resolution magnetic sensor can be formed with a simple structure. The magnetic detectors 320A and 320B detect magnetism synthesized from magnetism from the plurality of permanent magnets 313. Therefore, the effect of an error for each magnet is only marginal, achieving a high position detecting accuracy. Also if the magnetic piece array 309 is disposed inside the permanent magnet array 316 as shown in FIG. 18, a magnetic encoder that operates in the same manner as that according to the embodiment of FIG. 16 can be obtained.

FIGS. 19A and 19B show an embodiment in which an annular permanent magnet array 416 and an annular magnetic piece array 409 are arranged in the axial direction of a rotary shaft S. In the embodiment, the magnetic piece array 409 is fixed onto a circular plate 411 fixed to the rotary shaft S and rotates therewith. In the embodiment, magnetic detectors 420A to 420D are disposed in the center region of the permanent magnet array 416, that is, a region around the axis of the rotary shaft S. The magnetic detectors 420A and 420B are disposed in such positional relationship that a phase difference of 90° is caused between their outputs. In the embodiment, the permanent magnet array 416 and the magnetic detectors 420A to 420D are supported by the same support member. In the embodiment, the number (n±m) of magnetic pieces 407 in the magnetic piece array 409 is defined with n set to 25 and m set to +1. As a result, the number of the magnetic pieces 407 is 26. Also in the embodiment, a plurality of permanent magnets 413 are arranged such that magnetic poles having the same polarity face each other to form the annular permanent magnet array 416. Thus, two inner magnetic fields (leakage magnetic flux φ) make as many rotations as the number of the magnetic pieces 407 when the magnetic piece array 409 makes one rotation. Thus, in the embodiment, the two inside magnetic fields (leakage magnetic flux φ) make 26 rotations around the axis of the rotary shaft S. The magnetic detectors 420A to 420D detect the two rotating magnetic fields (leakage magnetic flux φ) and outputs sinusoidal signals offset by a phase of 90°.

Figure 20:
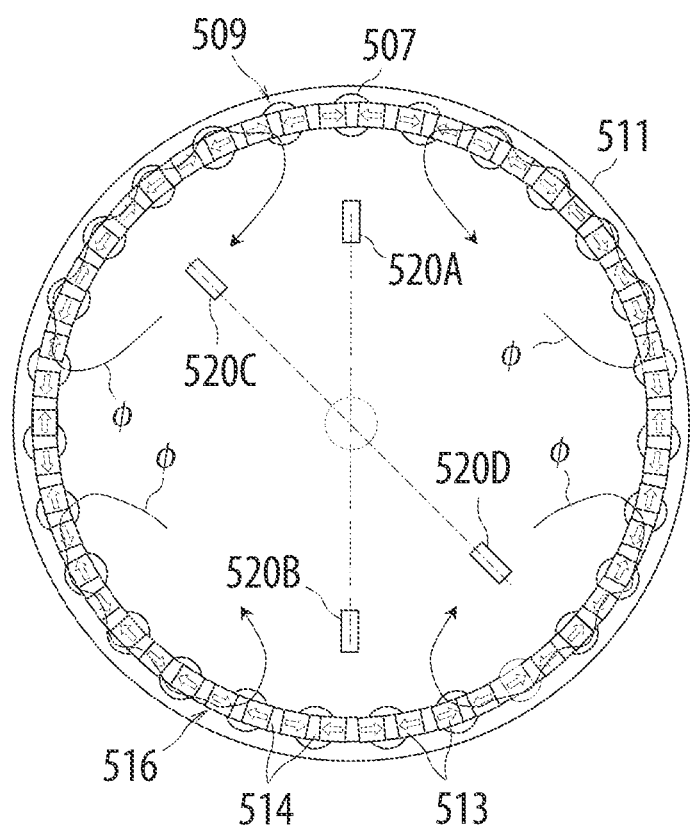
FIG. 20 is a schematic front view of another embodiment in which the present invention is applied to a rotary magnetic encoder.
Figure 21A:
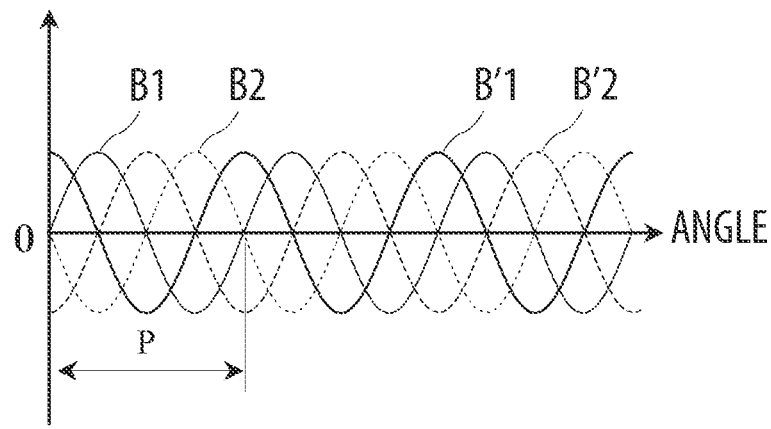
FIGS. 21A and 21B show the magnetic flux densities detected by magnetic encoders of FIG. 20 and the waveforms of voltages output from the magnetic encoders of FIG. 20, respectively.
Figure 21B:
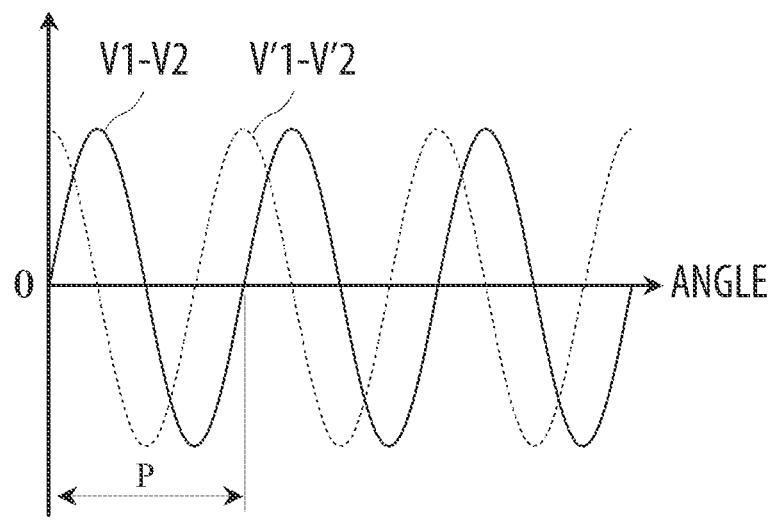

FIG. 20 shows an embodiment in which an annular permanent magnet array 516 and an annular magnetic piece array 509 are arranged in the axial direction of a rotary shaft S as in the embodiment of FIGS. 19A and 19B. In the embodiment, the number (n±m) of magnetic pieces 507 in the magnetic piece array 509 is defined with n set to 25 and m set to +2. As a result, the number of the magnetic pieces 507 is 27. In the embodiment, four inside magnetic fields (leakage magnetic flux φ) are generated, and the four magnetic fields (leakage magnetic flux φ) make as many rotations as the number of the magnetic pieces 507 when the magnetic piece array 509 makes one rotation. In the embodiment, a pair of magnetic detectors 520A and 520B are disposed at positions 180° away from each other in terms of mechanical angle, and a pair of magnetic detectors 520C and 520D are also disposed at positions 180° away from each other in terms of mechanical angle. In addition, the pair of magnetic detectors 520A and 520B and the pair of magnetic detectors 520C and 520D are disposed at positions 45° away from each other in terms of mechanical angle. With such an arrangement, the magnetic flux densities B1 and B2 detected by the pair of magnetic detectors 520A and 520B have sinusoidal waves offset by a phase of 90° as shown in FIG. 21A. In addition, the magnetic flux densities B'1 and B'2 detected by the pair of magnetic detectors 520C and 520D also have sinusoidal waves offset by a phase of 90° as shown in FIG. 21A. Thus, a sinusoidal voltage signal shown in FIG. 21B is obtained by obtaining a difference (V1−V2) between outputs of the pair of magnetic detectors 520A and 520B. In addition, a sinusoidal voltage signal shown in FIG. 21B is obtained by obtaining a difference (V'1−V'2) between outputs of the pair of magnetic detectors 520C and 520D. According to the embodiment, the obtained sinusoidal signals (V1−V2) and (V'1−V'2) have a high S/N ratio. In addition, a more accurate magnetic encoder that can cancel the effect of an external magnetic field and that is resistant to disturbance due to an external magnetic field can be obtained.

According to the present invention, it is possible to provide a low-cost magnetic encoder that facilitates generating sinusoidal magnetic flux and that improves resolution and interpolation accuracy.

While certain features of the invention have been described with reference to example embodiments, the description is not intended to be construed in a limiting sense. Various modifications of the example embodiments, as well as other embodiments of the invention, which are apparent to persons skilled in the art to which the invention pertains, are deemed to lie within the spirit and scope of the invention.

What is claimed is:

1. A magnetic encoder comprising:
    a permanent magnet array including a plurality of permanent magnets arranged such that magnetic poles having the same polarity face each other, or arranged such that the magnetic poles having different polarities face each other through a non-magnetic member interposed therebetween;
    a magnetic piece array including a plurality of magnetic pieces spaced from each other along the permanent magnet array; and
    a magnetic detector configured to detect leakage magnetic flux generated when the permanent magnet array and the magnetic piece array are displaced with respect to each other, wherein
    a pitch of the plurality of permanent magnets and a pitch of the plurality of magnetic pieces are determined to form a magnetic path in which magnetic flux emitted from one of the permanent magnets in the permanent magnet array passes through one of the magnetic pieces that faces the permanent magnet or the non-magnetic member adjacent to the one permanent magnet when the permanent magnet array and the magnetic piece array are continuously displaced with respect to each other; and
    when the pitch P of the magnetic pieces is defined as P=360° in terms of electrical angle, the pitch τp of the permanent magnets satisfies P/4<τp≤P/2.

2. The magnetic encoder according to claim 1, further comprising:
magnetic yokes disposed on both sides of each of the permanent magnets.

3. The magnetic encoder according to claim 2, further comprising:
coupling yokes configured to magnetically couple the magnetic yokes located at both ends of the permanent magnet array to collect leakage magnetic flux from the permanent magnet array, wherein
the magnetic detector is disposed to detect the leakage magnetic flux passing through the coupling yokes.

4. The magnetic encoder according to claim 2, wherein the magnetic detector is disposed adjacent to the magnetic yoke on an extension line of the permanent magnet array.

5. The magnetic encoder according to claim 2, wherein the permanent magnets and the magnetic yokes are formed to have an annular shape to surround the magnetic piece array.

6. The magnetic encoder according to claim 2, wherein the permanent magnets and the magnetic yokes are formed to have an annular shape to surround the magnetic piece array which has an annular columnar shape with a circular profile as seen in an extending direction of the permanent magnet array.

7. The magnetic encoder according to claim 1, wherein the magnetic detector is disposed to face the permanent magnet array with the magnetic piece array interposed therebetween.

8. The magnetic encoder according to claim 1, wherein the magnetic detector is disposed to face both the magnetic piece array and the permanent magnet array.

9. The magnetic encoder according to claim 1, wherein the permanent magnet array is longer than the magnetic piece array.

10. The magnetic encoder according to claim 1, wherein the plurality of magnetic pieces forming the magnetic piece array have an integral structure in which the magnetic pieces are coupled to each other by a coupling member having a magnetic resistance higher than that of the magnetic pieces.

11. The magnetic encoder according to claim 1, wherein the plurality of magnetic pieces forming the magnetic piece array have a rectangular or circular profile as seen from the permanent magnet side.

12. The magnetic encoder according to claim 1, wherein the plurality of magnetic pieces forming the magnetic piece array have a columnar shape with a circular profile as seen in a direction orthogonal to an extending direction of the magnetic piece array and to a direction toward the permanent magnet array.

13. The magnetic encoder according to claim 1, wherein the plurality of magnetic pieces forming the magnetic piece array have a columnar shape with a circular profile as seen in an extending direction of the magnetic piece array.

14. The magnetic encoder according to claim 1, wherein:
when magnetic poles having the same polarity face each other, the permanent magnet array is configured as an annular permanent magnet array centering on a rotary shaft, and the magnetic piece array is configured as an annular magnetic piece array centering on the rotary shaft; and
the magnetic detector is disposed in a region around an axis of the rotary shaft.

15. The magnetic encoder according to claim 14, wherein the annular permanent magnet array and the annular magnetic piece array are arranged in a radial direction of the rotary shaft.

16. The magnetic encoder according to claim 15, wherein a pair of magnetic detectors are disposed such that the directions of respective magnetic fluxes detected by the pair of magnetic detectors are 180° away from each other in terms of mechanical angle.

17. The magnetic encoder according to claim 14, wherein the annular permanent magnet array and the annular magnetic piece array are arranged in an axial direction of the rotary shaft.

18. The magnetic encoder according to claim 1, wherein the non-magnetic member is air.

19. The magnetic encoder comprising:
a permanent magnet array including a plurality of permanent magnets arranged such that magnetic poles having the same polarity face each other, or arranged such that the magnetic poles having different polarities face each other through a non-magnetic member interposed therebetween;
a magnetic piece array including a plurality of magnetic pieces spaced from each other along the permanent magnet array; and
a magnetic detector configured to detect leakage magnetic flux generated when the permanent magnet array and the magnetic piece array are displaced with respect to each other, wherein:
a pitch of the plurality of permanent magnets and a pitch of the plurality of magnetic pieces are determined to form a magnetic path in which magnetic flux emitted from one of the permanent magnets in the permanent magnet array passes through one of the magnetic pieces that faces the permanent magnet or the non-magnetic member adjacent to the one permanent magnet when the permanent magnet array and the magnetic piece array are continuously displaced with respect to each other;
the magnetic piece array is fixed to a circular plate to form an annular array along an outer peripheral surface of the circular plate, the circular plate being configured to be directly or indirectly rotated by rotation of a rotary shaft, and two or more permanent magnet arrays are disposed to arcuately extend to face the magnetic piece array; and
when the pitch P of the magnetic pieces is defined as P=360° in terms of electrical angle, the pitch $\tau p$ of the permanent magnets satisfies $P/4 < \tau p \leq P$.

20. The magnetic encoder according to claim 19, further comprising:
magnetic yokes disposed on both sides of each of the permanent magnets.

21. The magnetic encoder according to claim 20, further comprising:
coupling yokes configured to magnetically couple the magnetic yokes located at both ends of the permanent magnet array to collect leakage magnetic flux from the permanent magnet array, wherein
the magnetic detector is disposed to detect the leakage magnetic flux passing through the coupling yokes.

22. The magnetic encoder according to claim 20, wherein:
two magnetic piece arrays are disposed at positions 180° away from each other in terms of mechanical angle; and
two magnetic detectors are provided in correspondence with the two magnetic piece arrays, one of the two magnetic detectors being located P/4 away from an imaginary line connecting between the two magnetic piece arrays in a rotational direction of the rotary shaft, and the other of the two magnetic detectors being located P/4 away from the imaginary line in a direction opposite to the rotational direction of the rotary shaft.

* * * * *